United States Patent [19]
Bonke et al.

[11] Patent Number: 5,121,480
[45] Date of Patent: Jun. 9, 1992

[54] DATA RECORDING SYSTEM BUFFER MANAGEMENT AND MULTIPLE HOST INTERFACE CONTROL

[75] Inventors: Carl Bonke, Rancho Santa Margarita; Han Jen, Diamond Bar; Marc Acost, Mission Viejo, all of Calif.

[73] Assignee: Western Digital Corporation, Irvine, Calif.

[21] Appl. No.: 220,531

[22] Filed: Jul. 18, 1988

[51] Int. Cl.⁵ .............................................. G06F 13/12
[52] U.S. Cl. .................................... 395/250; 395/275; DIG. 1/238.6; DIG. 1/238.7; DIG. 1/239; DIG. 1/239.1; DIG. 1/239.51; DIG. 1/239.7; DIG. 1/244.3
[58] Field of Search ... 364/200 MS File, 900 MS File, 364/200, 900

[56] References Cited
U.S. PATENT DOCUMENTS

| | | |
|---|---|---|
| 4,138,732 | 2/1979 | Suzuki et al. ............ 364/900 |
| 4,590,551 | 5/1986 | Mathews . |
| 4,604,683 | 8/1986 | Russ et al. ................ 364/200 |
| 4,692,893 | 9/1987 | Casper ..................... 364/900 |
| 4,723,223 | 2/1988 | Hanada .................... 364/900 |
| 4,825,357 | 4/1989 | Ouies et al. .............. 364/200 |
| 4,864,496 | 9/1989 | Triolo et al. ............. 364/200 |
| 4,930,069 | 5/1990 | Batra et al. .............. 364/200 |
| 5,001,625 | 3/1991 | Thomas et al. ........... 364/200 |

Primary Examiner—Gareth D. Shaw
Assistant Examiner—John C. Loomis
Attorney, Agent, or Firm—Christie, Parker & Hale

[57] ABSTRACT

A circuit is provided for control and data transfer between a standard data storage device interface and one of a choice of several host computers. Parallel transition memories in conjunction with a buffer memory under common control of a buffer manager increase the transfer efficiency between the data storage unit and the host computer. Selectable register banks provide interface compatibility with multiple host computers for implementation of the invention.

27 Claims, 12 Drawing Sheets

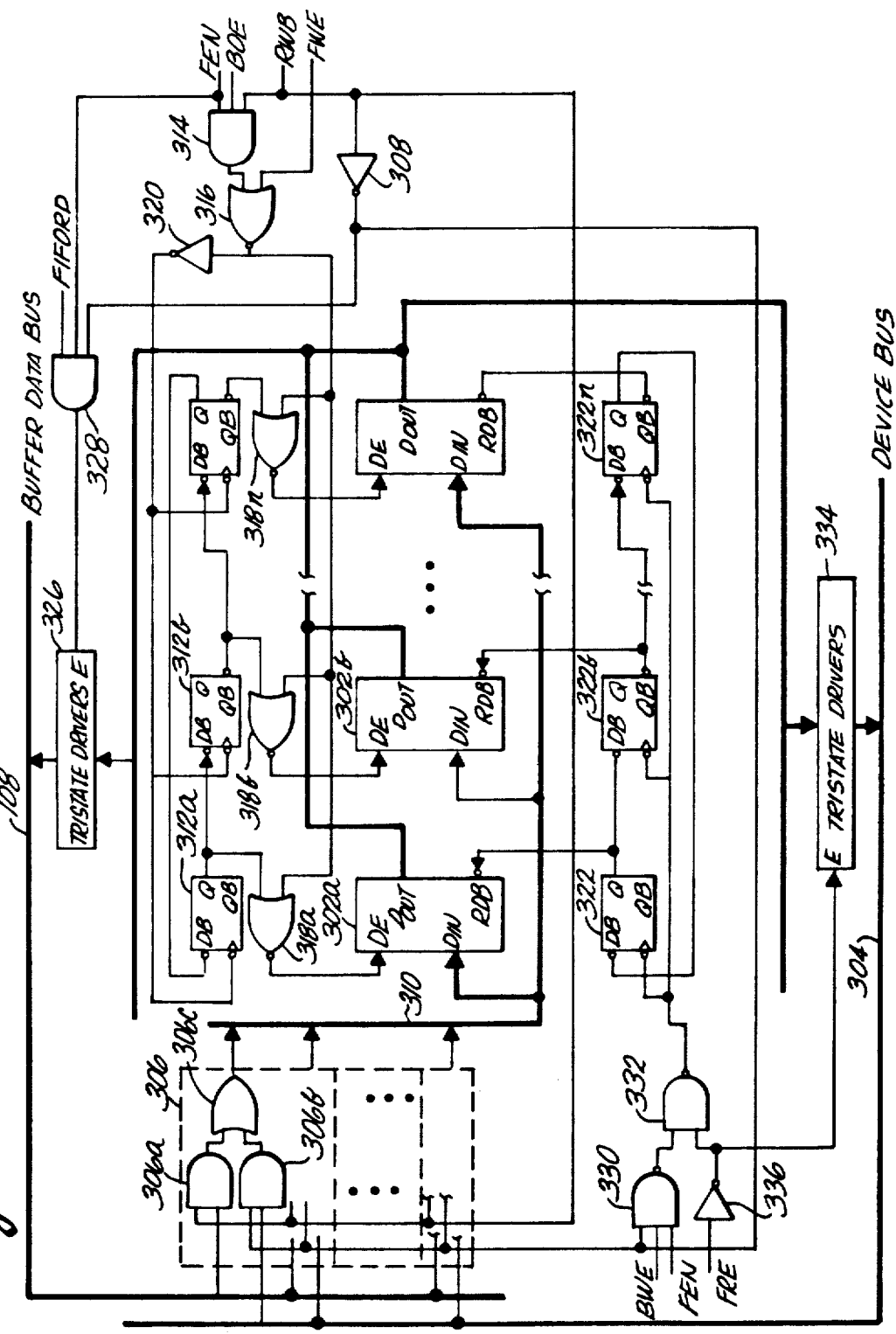

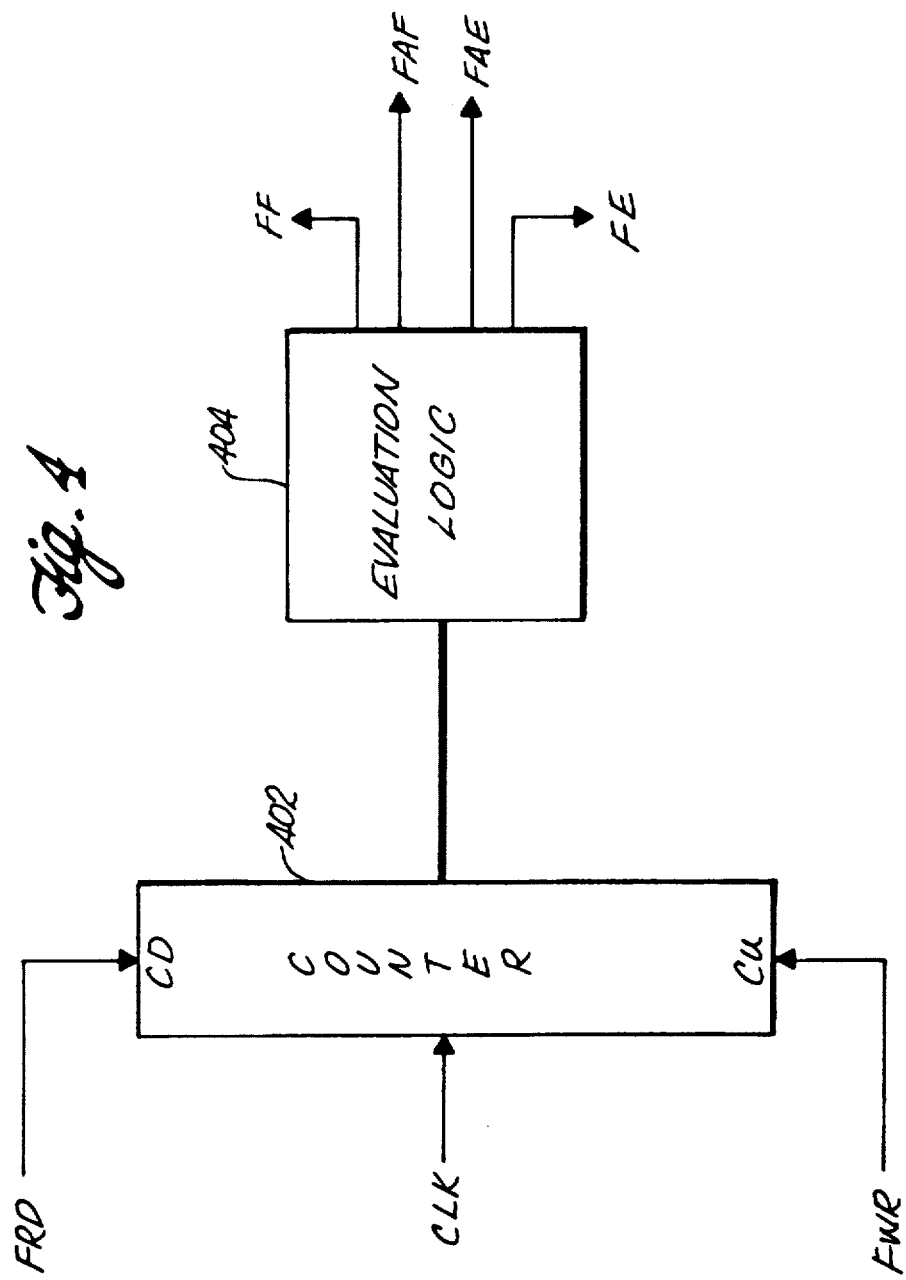

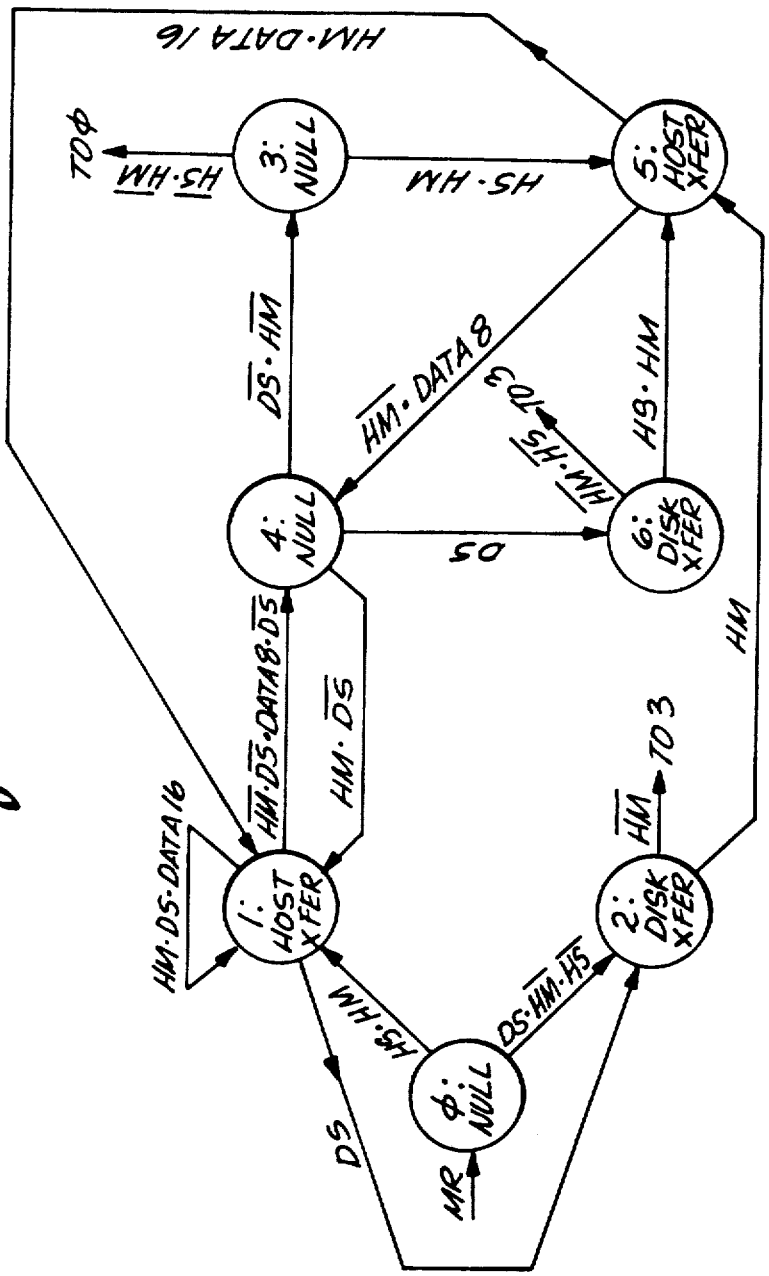

| S2 | S1 | S0 | HS | HM | DS | HTPI | DTPI | NS2 | NS1 | NS0 |
|---|---|---|---|---|---|---|---|---|---|---|
| 0 | 0 | 0 | 0 | 0 | 1 | 0 | 0 | 0 | 1 | 0 |
| 0 | 0 | 0 | 1 | X | X | 0 | 0 | 0 | 0 | 1 |
| 0 | 0 | 0 | X | 1 | X | 0 | 0 | 0 | 0 | 1 |
| 0 | 0 | 1 | X | 1 | 0 | 1 | 0 | 0 | 0 | 1 |
| 0 | 0 | 1 | X | 0 | 0 | 1 | 0 | 1 | 0 | 0 |
| 0 | 0 | 1 | X | X | 1 | 1 | 0 | 1 | 0 | 1 |
| 0 | 1 | 0 | X | 1 | X | 0 | 1 | 1 | 0 | 1 |
| 0 | 1 | 0 | X | 0 | X | 0 | 1 | 0 | 1 | 1 |
| 0 | 1 | 1 | 0 | 0 | X | 0 | 0 | 0 | 0 | 0 |
| 0 | 1 | 1 | 1 | X | X | 0 | 0 | 1 | 0 | 1 |
| 0 | 1 | 1 | X | 1 | X | 0 | 0 | 1 | 0 | 1 |
| 1 | 0 | 0 | X | 0 | 0 | 0 | 0 | 1 | 0 | 1 |
| 1 | 0 | 0 | X | X | 1 | 0 | 0 | 1 | 1 | 0 |
| 1 | 0 | 0 | X | 1 | 0 | 0 | 0 | 0 | 0 | 1 |
| 1 | 0 | 1 | X | 1 | X | 1 | 0 | 0 | 0 | 1 |
| 1 | 0 | 1 | X | 0 | X | 1 | 0 | 1 | 0 | 0 |
| 1 | 1 | 0 | 0 | 0 | X | 0 | 1 | 1 | 1 | 1 |
| 1 | 1 | 0 | 1 | X | X | 0 | 1 | 1 | 0 | 1 |
| 1 | 1 | 0 | X | 1 | X | 0 | 1 | 1 | 0 | 1 |

DATA RECORDING SYSTEM BUFFER MANAGEMENT AND MULTIPLE HOST INTERFACE CONTROL

This invention relates generally to controllers for data storage systems. In particular, this invention relates to a circuit for providing control and data transfer between a standard data storage device interface and one of a choice of several host computers through the use of parallel transition memory means in conjunction with a buffer memory under the common control of a buffer manager.

BACKGROUND OF THE INVENTION

Control circuits, commonly called peripheral controllers for data storage units such as hard disks, are employed to provide communications and data transfer to and from a host computer. Due to the widely disparate data transfer rates between the data storage units and the host computer, control of data transfer operations is often held by the peripheral controller to improve the efficiency of the host computer. Prior art systems commonly employ a buffer memory to store data extracted from the disk storage unit at a first slower data rate and then transferring data from the buffer memory to the host at a higher data rate. Transfer to the host may be accomplished under program input/output (PIO) or direct memory access (DMA). The peripheral controller typically provides addressing and read/write enablement for the buffer memory receiving data from the disk storage unit. The host computer accesses the buffer memory directly for data transfer to and from the host.

An example of the prior art having a common data bus between the host and the peripheral controller and having either a counter for memory addressing or a first in/first out (FIFO) memory for the buffer memory is disclosed in U.S. Pat. No. 4,527,233 to Ambroisus, III, et al. Control of the buffer memory by either the host computer or the peripheral controller precludes optimized data transfer rates. Parallel asynchronous access to the buffer memory is required to allow maximum transfer efficiency. The present invention provides such capability.

Prior art peripheral controllers typically interface a single type of host computer to a data storage unit. For disk drives, as an example, interface conventions such as ST 412, ST 506, and EDSI typically allow interchange between several disk drives and a single peripheral controller. A single peripheral controller capable of interfacing two disk drives with multiple interface formats is also desirable. The present invention provides interface and control capability for multiple host computer types and multiple data storage unit interface types.

SUMMARY OF THE INVENTION

The present invention provides a peripheral controller circuit managed by a microprocessor acting as a buffer manager for a static random access memory and an interface for data and command communication for multiple host computers. The buffer memory is a standard addressable static random access memory. A first in/first out (FIFO) memory separately addressable for read and write operations through the use of circular pointers is provided for intermediate storage of data transferred between the data storage unit controller and the buffer memory. A second first in/first out memory also separately addressable for read and write through the use of incrementable circular pointers is provided for intermediate storage of data transferred between the buffer memory and the host computer. A first incrementable counter maintains the buffer memory address for data transfer between the first FIFO and the buffer memory. A second incrementable counter maintains the buffer memory address for data transfer between the second FIFO and the buffer memory. A third counter is provided for counting data bytes transferred from the controller to the host. Incrementing of the counters and coordination of read and write enablement of the first and second FIFOs and the buffer memory is accomplished by a programmable logic array acting as a buffer manager.

The second FIFO comprises a lower FIFO for data transfers of one-byte width and a parallel upper FIFO for simultaneous transfer of a second byte, thereby allowing data transfer in two-byte words to compatible host computers. Single byte wide transfers using the lower FIFO may be accomplished when required due to host compatibility, during the transfer of error correction code bytes, or under command of the host computer.

The invention incorporates three banks of separately selectable registers for receiving command communications from the host computer and providing status to the host. Each bank of registers is responsive to a mode signal generated by the microprocessor based on the type of host computer present on the interface thereby enabling various combinations of the registers. Assertion of combinations of the mode signals presents a register set compatible with the interface requirement of the host computer present on the interface. Normal selection of the individual registers is accomplished by the host computer and the microprocessor during command and status communication.

DESCRIPTION OF THE DRAWINGS

FIG. 3 is a schematic logic diagram of the first in/first out intermediate storage memory;

FIG. 4 is a logic block diagram for the first in/first out memory counter;

FIG. 7 is a state diagram for the buffer manager;

FIG. 8a is a signal truth table resolving state machine input signals to the state change signals of the state diagram of FIG. 7;

FIG. 8b is a truth table for the state diagram of FIG. 7; and

DETAILED DESCRIPTION OF THE INVENTION

Figure 1:
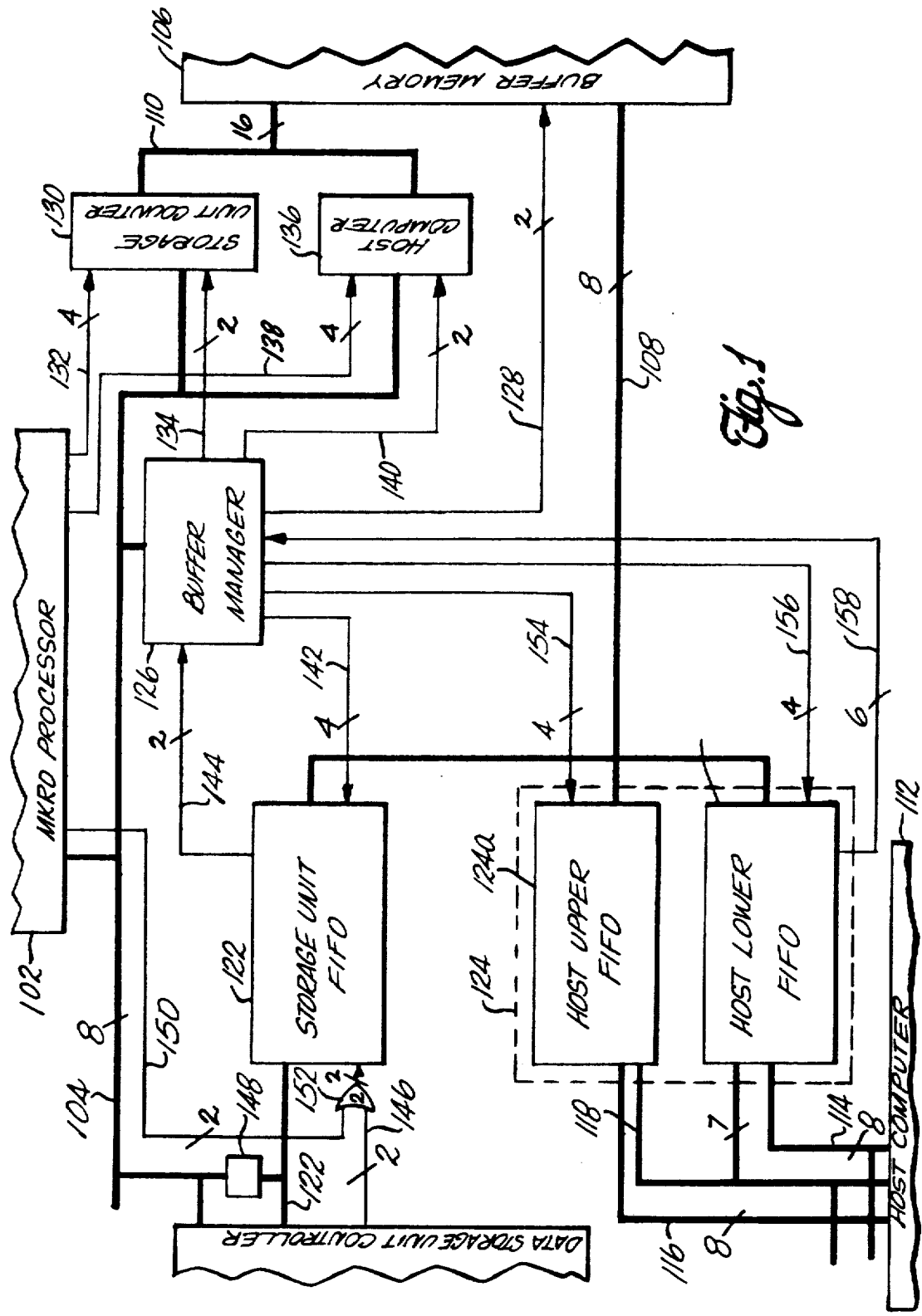
FIG. 1 is a schematic block diagram of the buffer memory interface structure between the host computer data storage unit controller and a microprocessor.

The present invention utilizes a triple bus architecture for interface to a standard data storage unit controller, a buffer memory comprising static random access memory, a host computer, and a microprocessor for management of the peripheral controller. The elements of the invention providing control of data transfer to and from the buffer memory are shown in FIG. 1. The microprocessor 102 communicates address and command data using the address data (AD) bus 104. Data transfer to and from the buffer memory 106 is accomplished on the buffer data (BD) bus 108. Addressing for the buffer memory is transmitted using the buffer address (BA) bus 110. Communication to and from the host computer 112 is accomplished using a lower host data (HD) bus 114, an upper host data bus 116 and a host address bus 118. Data is transferred from the data storage unit on the data (D) bus 120.

A first intermediate storage memory 122 connects the D bus with the BD bus. The first intermediate storage memory comprises a first in/first out memory having separately incrementable circular read and write pointers, to be discussed in greater detail subsequently. A second intermediate storage memory 124 connects the upper and lower HD buses with the BD bus. The second intermediate storage memory includes an upper FIFO communicating with the upper HD bus and a lower FIFO communicating with the lower HD bus. Each of the upper and lower FIFOs has separately incrementable circular read and write pointers, to be discussed in greater detail subsequently.

The first and second intermediate storage memories are enabled by a buffer manager 126. The buffer manager communicates with the microprocessor through the AD bus. The buffer manager is implemented in the preferred embodiment of the invention as a programmable logic array (PLA). The buffer manager provides read and write enable signals to the buffer memory on command lines 128. Addressing of the buffer memory is accomplished using a first counter 130 which maintains the buffer memory address for communication through the first intermediate storage memory with the data storage unit. Address data is provided to the first counter by the microprocessor through the AD bus. Read and write commands for upper and lower bytes of the buffer memory address are provided by the microprocessor to the counter on control lines 132. The buffer manager controls the loading of the address into the counter and the incrementing of the counter during data transfer operations between the data storage unit and buffer memory. These load and increment commands are provided to the first counter on control lines 134.

Similarly, for data transfer between the host computer and the buffer memory through the second intermediate storage memory, a second counter 136 is provided. Upper and lower address bytes are loaded from the AD bus. Read and write commands are provided from the microprocessor to the second counter on control lines 138. Pointer load and counter increment commands are communicated from the buffer manager to the second counter on control lines 140.

The first intermediate storage memory receives control signals from the buffer manager for enable, read/write direction, and buffer memory output or buffer memory write enable on control lines 142. Status of the first intermediate storage unit is provided to the buffer manager on control lines 144. Data transfer between the data storage unit and the first intermediate memory is controlled by read enable and write enable signals transmitted from the data storage unit to the first intermediate memory on control lines 146.

The invention provides for transmission of data directly between the microprocessor and buffer memory through the first intermediate storage memory. A tristate driver bank 148, under control of the microprocessor, interconnects the AD bus and the D bus. Read and write enable signals provided from the microprocessor on control lines 150 are received by the first intermediate storage memory through exclusive OR 152.

Control of the second intermediate storage memory is accomplished separately for the upper FIFO and lower FIFO. Upper FIFO enable, buffer output enable, buffer write enable, and read/write direction are provided by the buffer manager to the upper FIFO on control lines 154. Control signals for lower FIFO enable, buffer output enable, buffer write enable, and read/write direction are received by the lower FIFO from the buffer manager on control lines 156. The second intermediate storage memory provides status signals to the buffer manager on control lines 158. Status provided to the buffer manager by the second intermediate storage memory includes full and empty status and two levels of intermediate status designated almost full and almost empty for both two-byte read and write transfers from the host computer, and single-byte read and write transfers from the buffer memory and the host. Read and write control of the second intermediate storage memory by the host computer may be accomplished through the host address bus 118, or may be accomplished through direct memory access transfer, as will be described in greater detail subsequently.

Figure 2:
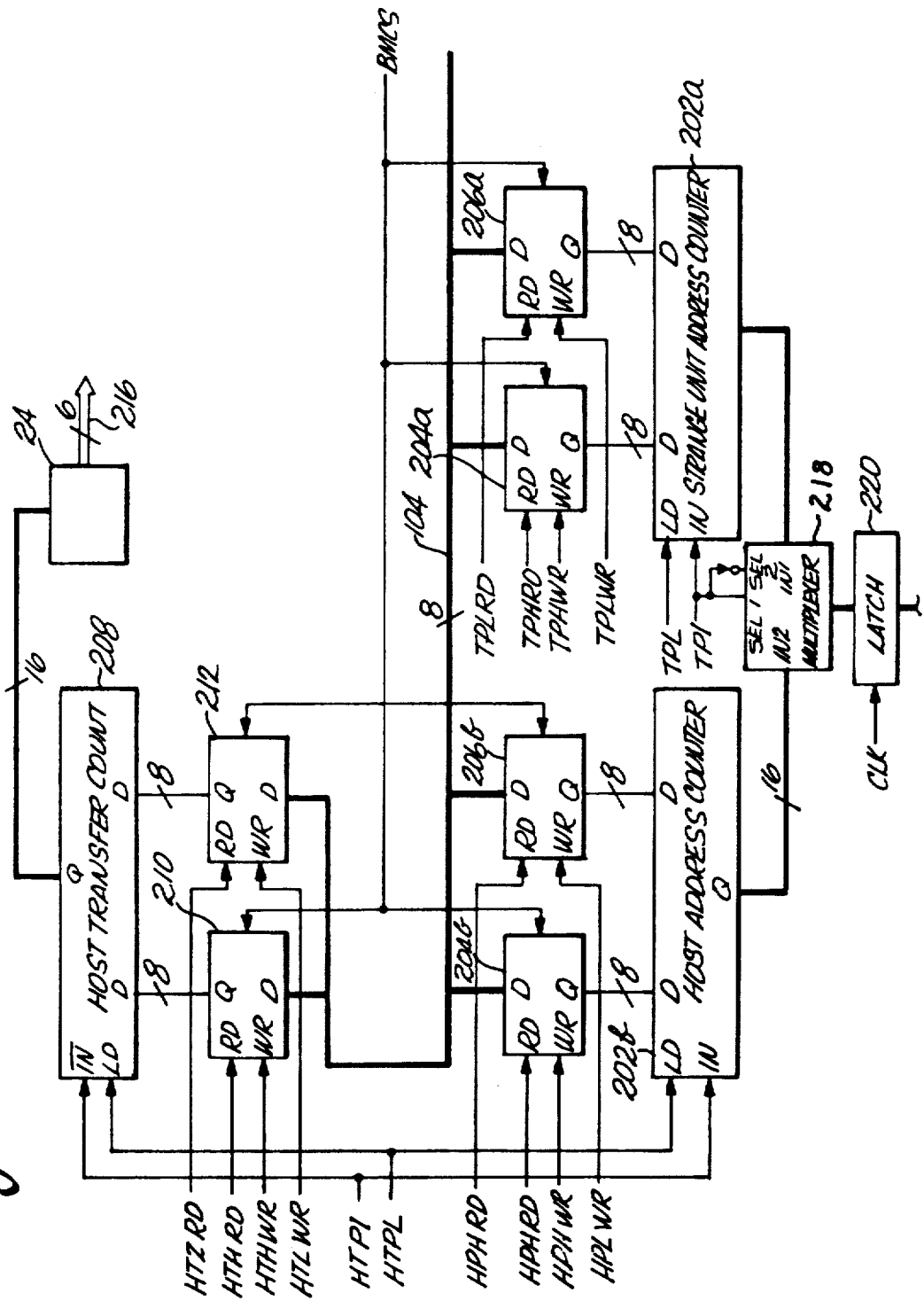
FIG. 2 is a schematic block diagram of the buffer memory counter system.

The first and second counters 130 and 136 are shown in greater detail in FIG. 2. The first counter maintains the buffer memory address for the data transfer between the storage unit and the buffer memory. The first counter comprises an incrementable counter unit 202A, an upper buffer pointer register 204A and lower upper buffer pointer register 206A. The microprocessor loads the address for a transfer to or from the buffer memory by transmitting the upper and lower bytes of the memory address on the AD bus 104 and loading the upper and lower bytes of the address into the upper and lower buffer pointer registers, respectively, by asserting the transfer pointer low read signal TPLRD and transfer pointer high read signal TPHRD. The upper and lower buffer pointer registers are pipelined to the incrementable counter, and the buffer memory address present in the registers is transferred to the counter upon command from the buffer manager for transfer pointer load TPL. As data is transferred from the buffer memory to the intermediate storage memory, the address counter is incremented by the buffer manager, asserting the transfer pointer increment signal TPI. The pipeline structure of the first counter means allows the microprocessor to load a second buffer memory address into the upper and lower buffer pointer registers, while a data transfer from the buffer memory is in process. The address present in the buffer pointer may be read by the microprocessor on the AD bus by assertion of the transfer pointer high read signal TPHRD, and the transfer pointer low read signal TPLRD for the upper and lower byte, respectively of the buffer pointer address.

The second counter maintains the address for data transfer between the buffer memory and the host computer. The second counter is configured similarly to the first counter having an incrementable counter 202B. A host upper pointer register 204B and a host lower pointer register 206B are pipelined to the incrementable counter. The host buffer transfer address is transferred from the AD bus by assertion of the host pointer high write HPHRW and host pointer low write HPLRW, respectively. Transfer of the address from the host buffer pointer registers to the host incrementable counter is accomplished by assertion of the host transfer pointer load signal HTPL by the buffer manager. The buffer manager increments the host buffer address counter through the host transfer pointer increment signal HTPI.

In the embodiment shown in FIG. 2, a third counter is provided for the number of data bytes to be transferred between the host computer and the buffer memory. A decrementing counter 208 provides the transfer count. An upper transfer count register 210 and a lower transfer count register 212 are pipelined into the decrementable counter. The upper and lower bytes of a transfer count are transmitted by the microprocessor on the AD bus and loaded into the upper transfer count register and lower transfer count register upon assertion of the host transfer high right signal HTHWR and the host transfer low right signal HTLWR respectively by the microprocessor. The transfer count is decremented simultaneously with the incrementing of the host address counter for the buffer address. Assertion of the HTPI signal by the buffer manager decrements the host transfer count and increments the host buffer address count. The transfer count present in the upper and lower transfer count registers is loaded into the decrementing counter simultaneously with loading of the host buffer transfer address by assertion of the HTPL signal by the buffer manager. The number of bytes to be transferred may be read on the AD bus by the microprocessor through assertion of the host transfer high read signal HTHRD or the host transfer low read signal HTLRD for the upper and lower bytes respectively.

Transfer count logic 214 converts the 16 bits of the host transfer count into the transfer count status signals 216, to be described in greater detail subsequently, for transmission to the buffer manager.

The address provided to the buffer memory is selected by multiplexer 218. Assertion of the TPI incrementing the storage unit address counter selects the buffer memory address for transfer between the storage unit and the buffer memory. A latch 220 responsive to the internal clock CLK captures the address for transmission to the buffer memory. When TPI is not asserted, the multiplexer selects the host address counter for buffer memory address.

The first and second intermediate storage memories comprise first in/first out memories having separately incrementable circular read and write pointers. The general configuration of these FIFO's is shown in FIG. 3. A plurality of flip/flop registers 302a, 302b, through 302n, provide the intermediate storage. The relative number of flip/flop registers in the first intermediate storage memory and second intermediate storage memory is determined based on data transfer rates of the data storage unit and host computer. In the preferred embodiment, the first intermediate storage memory contains three registers, while the upper and lower FIFO's of the second intermediate storage memory contain three registers each. Data is transmitted to and from the FIFO on parallel data buses. One bus for each FIFO will be the buffer data (BD) bus 108. The second bus or device bus 304 will be the data (D) bus 120 of FIG. 1 for the first intermediate storage memory and the upper and lower host data (HD) buses 116 and 114 of FIG. 1 for the second intermediate storage memory. The direction of data transfer between the buffer data bus and device bus is controlled by the read/write bit RWB, decode logic elements 306 driven by RWB, and RWB-generated by inverter 308, select the bus to be read. For each bit of the bus, a first AND gate 306a will select data from the buffer data bus when RWB is asserted while a second AND gate 306b will transmit data from the device bus if RWB- is asserted. The selected data passes through OR gate 306c to the FIFO write bus 310. The FIFO write pointer comprises a plurality of flip/flops 312a, 312b, through 312n, each enabling one register of the FIFO. One register of the FIFO is enabled to receive data from the FIFO write bus with data originating from the buffer data bus by assertion of the FIFO enable signal FEN, the buffer output enable signal BOE and RWB by the buffer manager. FEN, BOE and RWB pass through AND gate 314 and NOR gate 316 to a plurality of NOR gates 318a, 318b, through 318n. A low output from the enabling write pointer flip/flop passing through the associated FIFO register to receive data from the FIFO write bus. The signal falling edge created by deassertion of FEN, BOE or RWB through inverter 320 clocks the write pointer flip/flops incrementing the pointer location. Similarly, data from the device bus present on the FIFO write bus is written to a FIFO bank by assertion of the FIFO write enable signal FWE through NOR gate 316.

The FIFO read pointer comprises a second plurality of flip/flops 322A, 322B, through 322N. The read pointer flip/flop having a low output enables the associated FIFO bank to provide data out to the FIFO read bus 324. Data transfer from the FIFO read bus to the buffer data bus is accomplished through tristate driver 326 enabled by assertion of the buffer write enable signal BWE, the master FIFO read signal FIFORD and FEN by the buffer manager through AND gate 328. The signal falling edge created by deassertion of BWE or FEN through NAND gate 330 and NAND gate 332 clocks the FIFO read pointer flip/flops incrementing the read pointer.

Data is read from the FIFO read bus to the device bus through tristate driver 334 enabled by the FIFO write enable signal FRE through inverter 336. The signal falling edge created by deassertion of FRE through inverter 336 and NAND gate 332 provides clocking for the FIFO read pointer flip/flops, thereby incrementing the pointer.

For the first intermediate storage memory, FRE and FWE may be generated by either the data storage unit controller or the microprocessor. Control lines 146 of FIG. 1 provide the read enable and write enable signals from the data storage unit controller. Control lines 150 provide the read enable and write enable signals from the microprocessor. The read enable signals pass through the first of the OR gate pair 152 while the write enable signals pass through the second of the OR gate pair 152.

FRE and FWE are provided in the second intermediate storage memory by decoding the signals present on the host address bus 118 of FIG. 1. In the second intermediate storage memory, FEN is generated by the buffer manager separately for the upper FIFO and lower FIFO. Data received from the host in single byte format is transmitted through the lower FIFO. Data transmitted to or from the host in two-byte data word format is transmitted on the buffer data bus from the buffer memory as single bytes entering the upper and lower FIFO through alternating selection of the upper and lower FIFO enable signals by the buffer manager.

Each of the first and second intermediate storage memories further comprises a differential counter for determining how full the FIFO is. The basic structure of the differential counter is shown in FIG. 4. The counter element 402 receives a FIFO write signal (FWR) on input CU to increment the counter. Conversely, a FIFO read signal (FRD) received on input CD causes the counter to decrement. If the counter receives an essentially simultaneous FRD and FWR signal within one clock period, a null count NC is generated. Counter evaluation logic 404 communicates with the counter to provide FIFO status signals to the buffer manager. As shown in the embodiment in FIG. 4, these signals may include a FIFO full signal FF, a FIFO almost full signal (FAF), a FIFO almost empty signal FAE, and a FIFO empty signal FE.

Figure 5A:
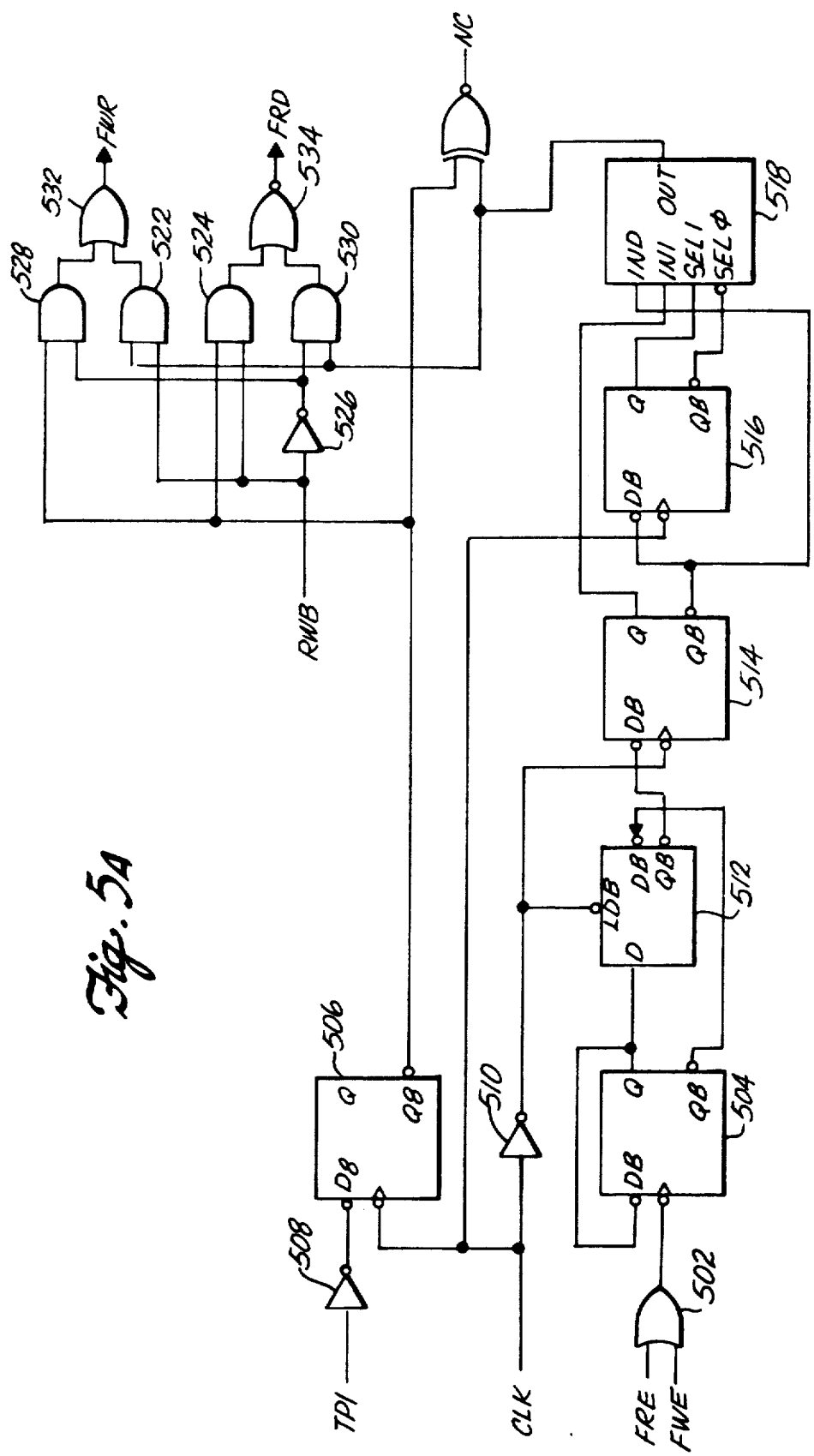
FIG. 5A is a detailed logic schematic diagram for the increment/decrement control signal for the first in/first out memory counter of FIG. 4.
Figure 5B:
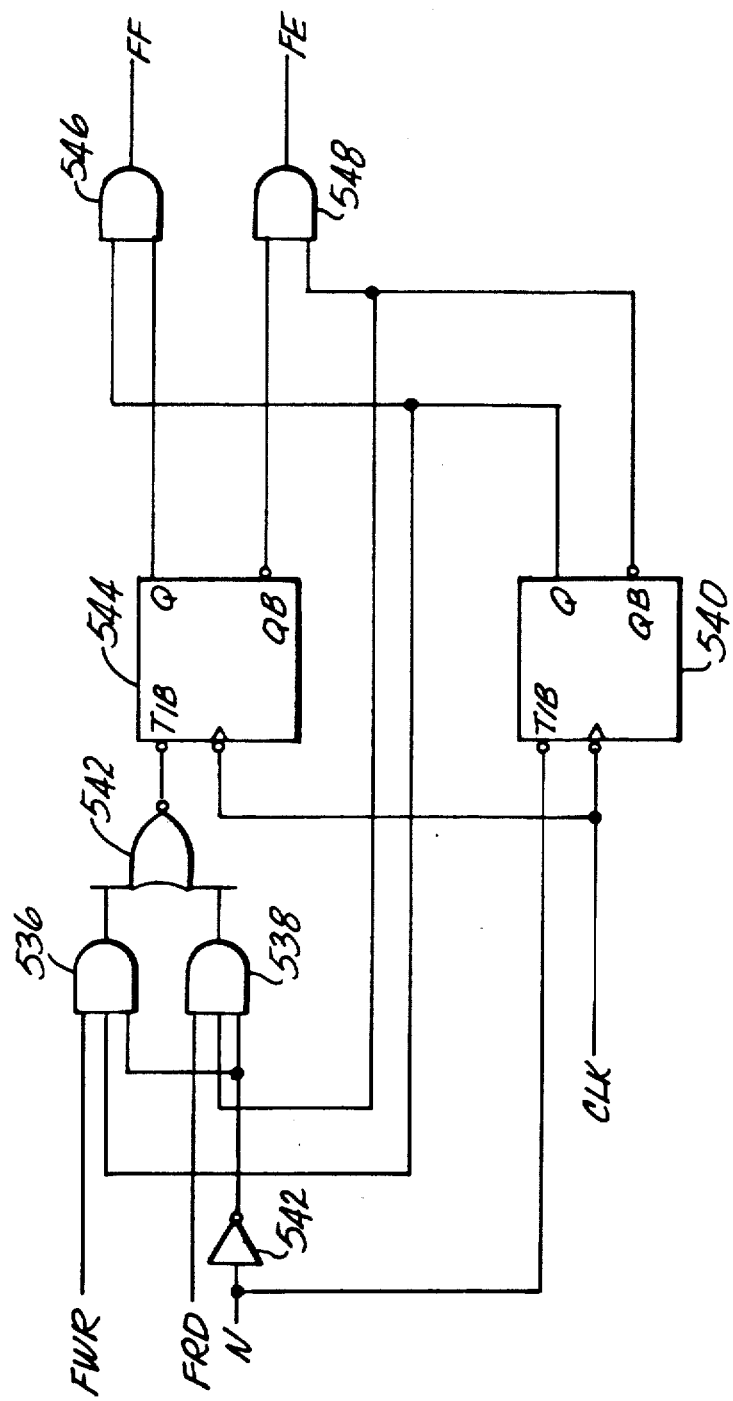
FIG. 5B is a schematic logic diagram for a count up/count down counter employing the increment/decrement signals from FIG. 5A for a first in/first out memory having three banks of flip/flops.
Figure 5C:
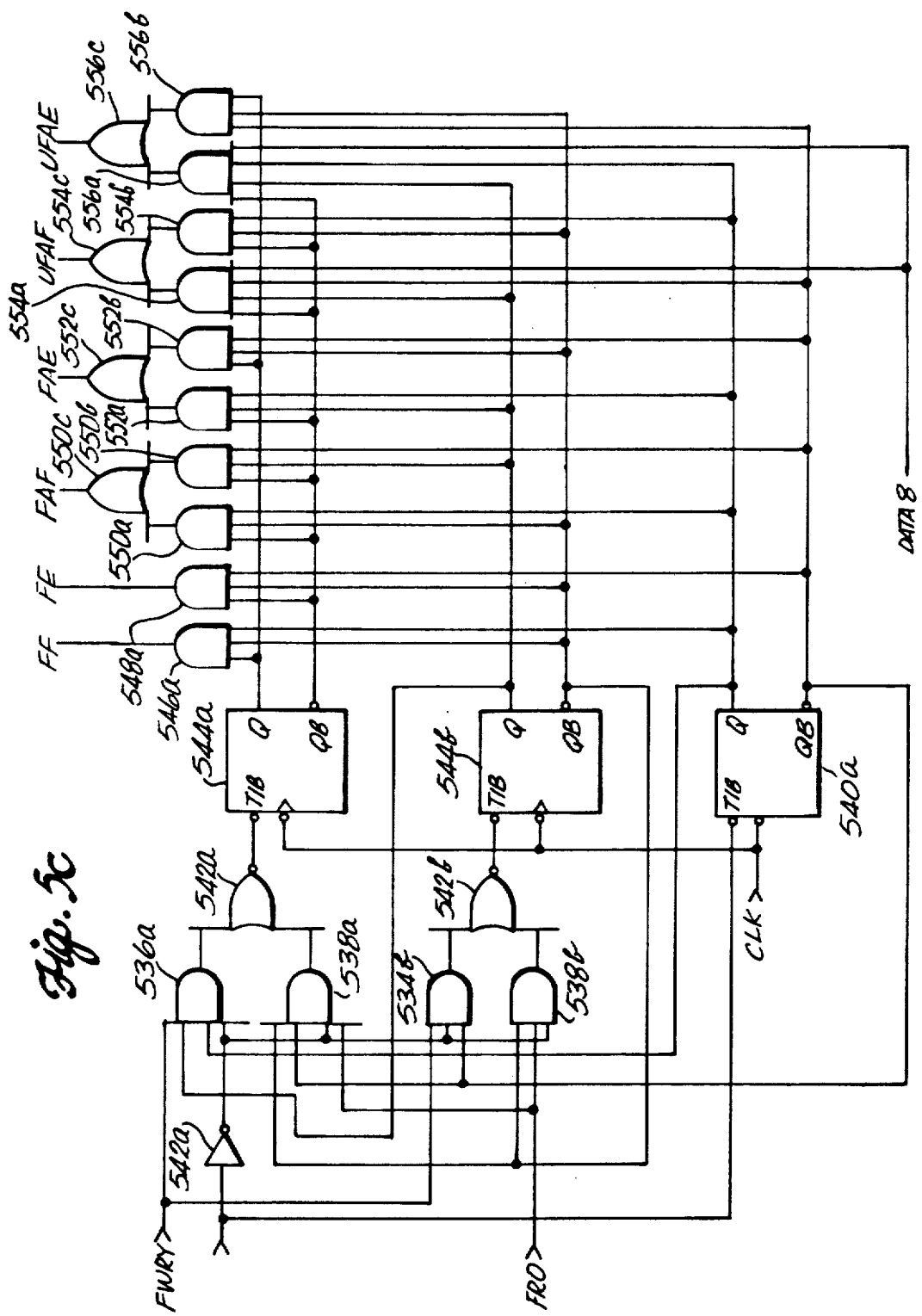
FIG. 5C is a count up/count down counter using the increment/decrement signals from FIG. 5A for a first in/first out memory having five flip-flop registers.

The preferred embodiment of the differential counter is shown in FIG. 5A, 5B, and 5C. The logic circuit in FIG. 5A provides sensing of read and write signals to the FIFO and determines whether count up, count down, or NO COUNT signals for the counter are required. The FIFO read enable and write enable signals FRE and FWE provide clocking through OR gate 502 for flip/flop 504. Clocking of flip/flop 504 on the trailing edge of FRE and/or FWE toggles the output. The transfer pointer increments signal (TPI) is provided to flip/flop 506 through an inverter 508. The trailing edge of the clock pulse (CLK) clocks flip/flop 506. CLK inverted through inverter 510 provides a rising edge for loading the output of flip/flop 504 into sample and hold 512. The next trailing edge of CLK inverted clocks flip/flop 514 loading the output of the sample and hold. Flip/flop 516 and multiplexer 518 provide an exclusive OR function on the normal and inverted outputs of flip/flop 514. The outputs of multiplexer 518 and flip/flop 506 are provided to exclusive OR gate 520. A high output from exclusive OR 520 provides a null count signal (NC). RWB indicating the direction of transfer in the FIFO is provided to AND gates 522 and 524. RWB inverted through inverter 526 is provided to AND gates 528 and 530. The direction of transfer indicated by RWB, a read or write enable of the FIFO indicated by FRE or FWE and the increment signal TPI indicating a transfer to the device connected the FIFO, are decoded through AND gates 528, 522, 524, and 530 to provide a FIFO write signal FWR through NOR gate 532 or a FIFO read signal FRD through NOR gate 534.

FWR indicating a count up, FRD indicating a count down, or NC indicating a null count are provided to a counter circuit. The element of the counter circuit are dependent upon the number of registers in the FIFO to provide status information to the buffer manager. FIG. 5B illustrates an implementation for a FIFO having three registers. In the preferred embodiment, a three register FIFO is used as the intermediate storage memory for transfers between the data storage unit and the buffer memory. In FIG. 5B, FWR is routed to a first AND date 536, while FRD is routed to a second AND gate 538. NC is provided to a first toggling flip-flop 540 and through inverter 542 to AND gates 536 and 538. The normal output of toggling flip-flop 540 is provided to AND gate 536 while the inverted output of flip-flop 540 is provided to AND gate 538. AND gates 536 and 538 feed a NOR gate 542 which in turn provides the toggle input for toggle flip-flop 544. The normal outputs of flip/flops 540 and 544 are combined through AND gate 546 to provide a FIFO FULL signal (FF). The inverting outputs of flip/flops 540 and 544 are combined through AND gate 548 to produce the FIFO EMPTY signal (FE).

As the number of registers in the FIFO is increased, additional FWR and FRD decode logic and toggling flip/flops are required.

Implementation of the differential counter for a five-register flip-flop is shown in FIG. 5C. FWR is provided to AND gates 536A and 536B, while FRD is provided to AND gates 538A and 538B. NC provides toggle control for toggling flip-flop 540A and is inverted through inverter 542A for input into AND gates 536A, 536B, 538A, and 538B. OR gate 542A combines the signals from AND gate 536A and 538A to provide the toggle signal for toggling flip-flop 544A. NOR gate 542B combines the output signals from AND gates 536B and 538B to provide the toggle signal input for toggling flip-flop 544B. The normal output from toggling flip/flops 540A and 540B are routed through AND gate 536A while the inverting outputs from flip/flops 540A and 544B are routed through AND gate 538A. Toggling flip/flops 544A, 544B, and 540A, provide three count bits for decoding to provide FIFO status evaluation. FF and FE are provided through AND gates 546A and 548A respectively. The FIFO almost full signal (FAF) is generated by AND gates 550A and 550B through OR gate 550C. The FIFO almost empty signal (FAE) is generated through AND gates 552A and 552B through OR gate 552C.

In the preferred embodiment, the implementation of the second intermediate storage memory uses an upper and lower FIFO to provide two byte word capability for transfer between the host computer and buffer memory. During two byte wide transfers, the buffer memory transfer bytes alternately between the upper and lower FIFO under the control of the buffer manager. Transfer to the host computer take bytes simultaneously from the upper and lower FIFO in a two byte word. Consequently, in addition to the FIFO almost full and FIFO almost empty signals a second signal pair upper FIFO almost full (UFAF) and upper FIFO almost empty UFAE are generated to allow the buffer manager to continue filling the upper and lower FIFO alternately with single byte data from the buffer memory. UFAF is generated as shown in FIG. 5C through AND gate 554A and 554B through OR gate 554C. Similarly, UFAE is generated by AND gates 556A and 556B through OR gate 556C. An additional signal DATA8 is provided to AND gates 554A and 556A designating word length transfer through the second intermediate storage memory by the host computer.

Figure 6:
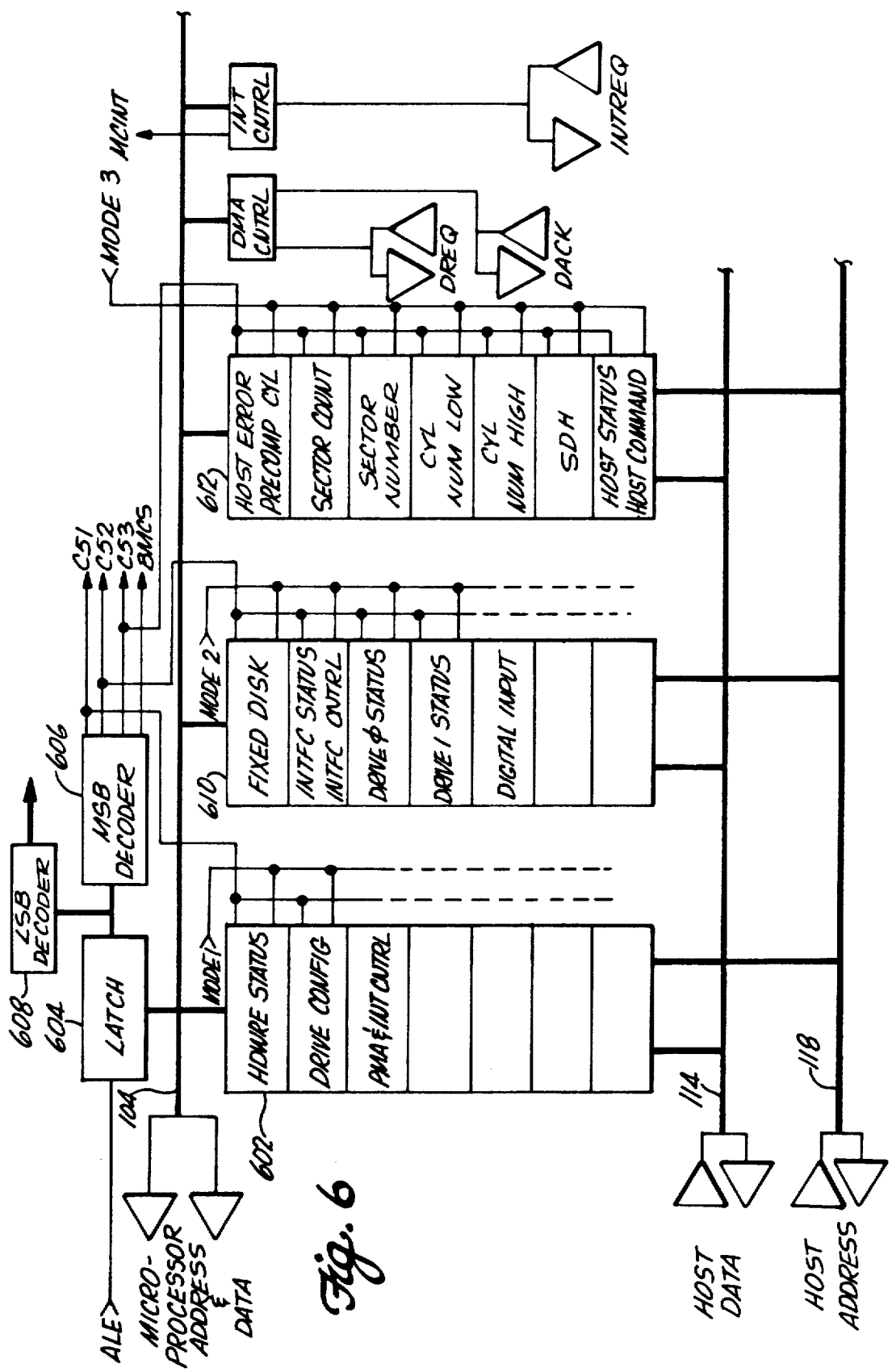
FIG. 6 is a schematic block diagram of the multiple register bank configuration for multiple host interface.

The present invention will support various host computer configurations. Referring now to FIG. 6, a microprocessor address and data bus 104, host data bus 114, and host address bus 118 are provided as previously discussed with regard to FIGS. 1 and 2. A first plurality of registers 602 communicates with the AD and HD buses. The first plurality of registers is enabled by a first mode signal MODE1. Addressing of the registers by the microprocessor is accomplished through an address latch 604 enabled by the address latch enable signal ALE. A register address placed by the microprocessor on the AD bus is placed in the latch by assertion of ALE. The latched address is then read by decoder 606 to provide first, second and third chip select signals CS1, CS2, and CS3, and the buffer manager chip select signal BMCS. CS1 selects the registers of the first plurality of registers for transfer of data from the AD bus. In the preferred implementation, the chip select signals are decoded from the most significant bits of the microprocessor address. Individual address registers are designated by decoding the least significant bits of the microprocessor address through decoder 608 providing a distinct enabling signal for individual registers represented collectively as E. Assertion of the chip select signal and the enable signal for each individual register allows data to be read from or written to the register. Those skilled in the art will recognize that combination of the mode signal, chip select signal, and read and write enable signals from either the microprocessor or the host may be logically combined to provide read enable and write enable signals for the individual registers.

A second plurality of registers 610 responsive to a second mode signal MODE2 is also provided. A third plurality of registers 612 responsive to a third mode signal MODE3 is provided as yet another communication path. The second and third pluralities of registers also communicate with the microprocessor through the AD bus and the host through the HD and HA buses. Chip select signals CS2 and CS3 are provided for selection of the first plurality and second plurality of registers respectively by the microprocessor. The host chip select signal HCS selects the registers for communication with the host computer.

Selection of one or more of the mode signals provides a complement of registers for use in communication between the microprocessor and the host computer. The preferred embodiment exemplified in FIG. 6 may be understood by reference to three existing host computer types. Enabling MODE1 provides registers for communication between the microprocessor and computer equivalent to the IBM-XT. The second and third pluralities of registers are idle in this mode of operation. The registers provided for the IBM-XT include a first register for hardware status and hardware reset, a second register for drive configuration and drive select, and a third register for DMA and interrupt control. The function of these registers is known to those skilled in the art and is dependent upon the host read and write enable functions upon selection.

A second computer type may be interfaced using the preferred embodiment by the selection of MODE2 and MODE3 signals. Computers of the type represented by the IBM-AT are supported with MODE2 and MODE3 simultaneously selected. The selection of MODE2 provides a complement of registers having interface functions for fixed disk, interface status and interface control, drive 0 status, drive 1 status, and digital input. Selection of MODE3 provides a complement of registers having the functions of host error and precomp cylinder, sector count, sector number, cylinder number low, cylinder number high, SDH, and host status and host command. When the IBM-AT configuration is supported, the registers responsive to MODE1 are inactive. Designation of the individual registers is dependent upon the computer type selected for interface. Mode selection for the various registers is under firmware control in the microprocessor.

Other host computer architectures may be interfaced through various combinations of mode and chip select signals by the microprocessor. In addition, a non-intelligent slave host may be interfaced through the bi-directional capability of the host address bus. Referring again to Table 1, the host read enable, host write enable, and host chip select signals are asserted by the microprocessor. DMA requests are issued by the microcontroller in response to the RCS signal from the slave host, reversing the roles of DMA request and DMA acknowledge. Similarly, the interrupt request is input from the slave host to the microprocessor to initiate the command process. Host address latch enable is used by the slave device to latch a register address present on the host data bus.

TABLE 1

| HOST ADDRESS BUS DESCRIPTION | | | |
|---|---|---|---|
| MNEMONIC | SIGNAL NAME | I/O | FUNCTION |
| HA0 | HOST ADDRESS 0 | I | These four inputs are used to address the internal |
| HA1 | HOST ADDRESS 1 | I | registers. Internal decoding of these address signals |
| HA2 | HOST ADDRESS 2 | I | is a function of the mode select: port compatibility |
| HA9/ | HOST ADDRESS 9 | I/O | is maintained for both the various host computer types. |
| HALE | /HOST ALE | | In slave host mode, HALE is used by the peripheral device to latch the address from HD0 through HD7. |
| HRE- | HOST READ ENABLE | I/O | HRE- is asserted by the host computer in conjunction with HCS- to read an internal register or the FIFO. In slave mode, HRE- is asserted when MRE- is asserted. It can also be asserted by the slave peripheral in DMA mode. |
| HWE- | HOST WRITE ENABLE | I/O | HWE- is asserted by the host computer in conjunction with HCS to write an internal register or the FIFO. In slave mode HRE- is asserted when MRE- is asserted. It is also asserted by the slave peripheral in DMA mode. |
| HCS- | HOST CHIP SELECT | I/O | HCS- should be decoded from the host address bus and is used to qualify HRE- and HWE- for host accesses. In slave mode HCS- is asserted when the local microcontroller is accessing the slave device address space. |

TABLE 1-continued

HOST ADDRESS BUS DESCRIPTION

| MNEMONIC | SIGNAL NAME | I/O | FUNCTION |
|---|---|---|---|
| IOCS16-/ DREQ | I/O CHIP SELECT 16 / DMA REQUEST | O | This output is programmable to function as the PC/AT bus signal IOCS16- when the PIO mode is selected or as a DMA Request signal (DREQ) in the DMA mode. This output is tristated at power-up and remains tristated until the interface mode is set by the local microcontroller. IOCS16- is an open-drain output. |
| DACK-/ RCS- | DMA ACKNOWLEDGE RCS | I | DACK- is asserted by the Host in response to the DREQ signal assertion in order to complete the DMA handshake. RCS- is used in slave mode to qualify host data transfers to/from the FIFO. |
| INTRQ | INTERRUPT REQUEST | I/O | INTRQ indicates to the host computer that a data block transfer is requested or a command has been completed. In slave host mode INTRQ is asserted by the slave peripheral device. |

An additional feature of the invention as shown in FIGS. 1 and 6, is the separation of buses to allow simultaneous data transfer and microprocessor control. The architectural arrangement of the AD bus, BD bus, D bus, HD bus and HA bus eliminates the requirement imposed by prior art systems that the microprocessor be inactive during data transfer. As an example, data transfer between the data storage unit and buffer memory through the first intermediate storage memory may take place simultaneously with communication by the microprocessor and host computer through the appropriate control registers shown in FIG. 6. Similarly, microprocessor communication with the data storage unit controller may be accomplished in parallel with data transfer from the buffer memory through the second intermediate storage memory to the host computer. This parallel architecture allows significant improvement in data transfer rates by allowing command communication and set-up for command execution simultaneously with data transfer.

Similarly, the implementation of the first intermediate storage memory and second intermediate storage memory allows simultaneous data transfer by the invention with the data storage unit and the host computer. The buffer manager provides control for the first intermediate storage unit, second intermediate storage unit, and buffer memory to coordinate data transfer in reliance on the differing data transfer rates of the data storage unit, host computer, and buffer memory.

As previously described, the buffer manager in the preferred embodiment is a programmable logic array. The PLA receives status signals from the elements under its control and provides control signals for coordinating data transfer. A state diagram for the buffer manager is shown in FIG. 7. In the preferred embodiment, seven basic states exist in the buffer manager PLA. The 0 state is induced by a master reset signal MR. Three basic modes result in transitions between states within the buffer manager. A single host transfer mode HS results in transfer to the host computer of single words or single bytes of data. The multiple or burst host transfer HM provides for transfer of multiple bytes or words to or from the host computer. The single disk transfer mode DS, which transfers to the host computer in byte or word format, is determined by the 8-bit host signal DATA8 and 16-bit host signal DATA16.

The transition signals described above are logically derived from the status and control signals analyzed by the PLA. FIG. 8 provides a truth table for each state demonstrating the signal designation. Referring to FIG. 7, the buffer manager PLA will exit the 0 state and transition to state 1 upon receipt of the HS or HM signal. In state 1, the PLA enables the first intermediate storage memory to transfer data to or from the host. Continued assertion of HM in combination with DATA16 and no disk transfer requested, will result in the PLA's remaining in state 1. If HM is deasserted and no DS is requested, or DATA8 is asserted with DS not requested, the PLA will transition to state 4. If from state 1 a disk transfer is desired, DS will be asserted, causing the PLA to transition from state 1 to state 2. State 2 may also be entered from the 0 state by initial assertion of a DS signal requesting disk transfer when no host transfer has been requested.

From state 4, the PLA will return to state 1 upon reassertion of HM if no disk transfer is requested. If a disk transfer has been requested and DS is asserted, the PLA will transition from state 4 to state 6 to accomplish the disk transfer. From either state 2 or state 6, if no host transfer is requested, the PLA will transition to state 3. Assertion of HM with the PLA in state 2 will cause a transition to state 5. Similarly, assertion of HS or HM while the PLA is in state 6 will transition the PLA to state 5.

In states 2 and 6, the PLA enables the first intermediate storage memory for transfer of data by the data storage unit. State 5, like state 1, results in enablement of the second intermediate storage memory for data transfer with the host computer from state 5. If a host multiple transfer has not been requested, or DATA8 is asserted, the PLA will transition to state 4. If, however, a multiple host transfer is requested and HM is asserted with DATA16 also asserted, the PLA will transition to state 1.

If the PLA is in state 4 and no disk transfer is requested and no multiple-host transfer is requested, the PLA will transition to state 3. From state 3, a request for host transfer, either as a single or multiple transfer, will result in the PLA transitioning from state 3 to state 5. Conversely, no request for host transfer, multiple or single, will result in the PLA transitioning from state 3 to state 0.

Each transfer state in the PLA state logic, states 2 and 6 for disk transfer, and states 1 and 5 for host transfer, provide for bi-directional transfer. In each transfer command transaction between the buffer manager and one of the intermediate storage memories, the buffer manager enables the FIFO and maintains control of the subordinate function for data transfer while the device obtaining the transfer maintains control of the primary transfer function. As an example, in transfer from the data storage unit controller to the buffer memory, the buffer manager enables the first FIFO. The data storage unit controller asserts the FIFO write enable to begin filling the FIFO registers with data. Data present in the first register of the FIFO will result in deassertion of the FIFO empty signal. The buffer manager will determine if the buffer memory is currently involved in a data transfer, and if not, will assert the buffer write enable signal BWE and the FIFO read signal FIFORD to enable transfer from the FIFO to the buffer memory. The primary control signal or FIFO write enable FWE was asserted by the transfer device while the subordinate transfer signal, buffer write enable BWE, was asserted by the buffer manager.

Conversely, if the data transfer is from the buffer manager to the data storage unit controller, the buffer manager will enable the FIFO and then assert the buffer output enable signal BOE to begin filling the FIFO. Upon assertion of the FIFO full signal FF, the buffer manager will deassert BOE. Reading of data from the FIFO by the data storage unit controller is accomplished by assertion of the FIFO read enable signal FRE, which is now the primary control. After the data storage unit has read data from the first register, the FIFO full signal will be deasserted. The buffer manager will then assert the buffer output enable signal, which is now the subordinate control to write data from the buffer memory to the FIFO.

Due to the slower transfer rate capability of the data storage unit, the buffer manager gives priority to data transfer involving the first intermediate storage memory over data transfer involving the second intermediate storage memory.

As shown in FIG. 4 and previously described, the second intermediate storage memory provides FIFO almost full FAF and FIFO almost empty FAE signals in addition to FF and FE to the buffer manager. The FAF and FAE signals prevent overrunning of the FIFO in either the read or write mode by a host having a data transfer rate exceeding that of the peripheral controller when the host computer is operating in a burst data mode such as DMA. As an example, if the host computer is transferring data to the buffer memory, data will be loaded into the FIFO until two registers remain, at which time FAF will be asserted. Note that transfer of data from the FIFO to the buffer memory under command of the buffer manager may also be in process; however, the greater transfer rate of the host computer will eventually bring the differential counter to within two counts of full. Upon assertion of FAF, the buffer manager will deassert the FIFO enable. The buffer manager will then single step the data transfer to the host by manipulation of the FIFO enable signal. Referring to FIG. 7, this sequence can be noted as transition by the buffer manager from state 1 through states 3 and 4 to state 5. A similar sequence is employed for data transfer to the host computer using the FAE signal.

Figure 9:
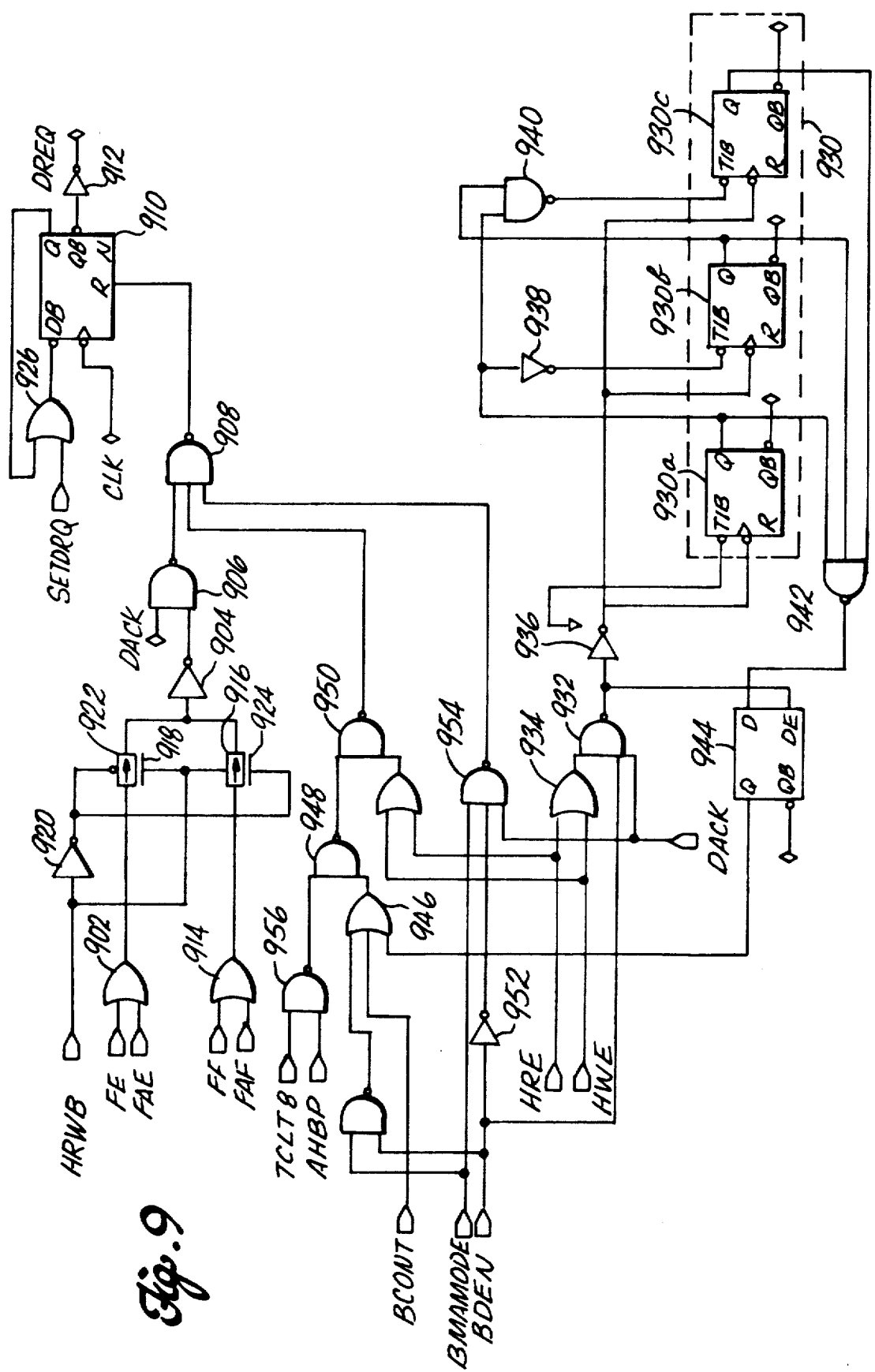
FIG. 9 is a schematic logic diagram of the 8 byte burst counter.

This function may be implemented as shown in FIG. 9A. The host read/write bit HRWB determines the selection of control signals based on direction of the transfer. For transfer from the FIFO to the host computer, assertion of either the FIFO almost empty FAE or FIFO empty FE signal through NOR gate 902 and inverter 904 will result in a high input to NAND gate 906. The DMA acknowledge signal DACK is high if DMA transfer to the host computer is in process. The resulting low signal from NAND gate 906 forces NAND gate 908 high, resetting flip-flop 910. The inverted output of the flip-flop transmitted through inverter 912 deasserts the DMA request DREQ.

Similarly, for a data transfer from the host computer to the FIFO, assertion of the FIFO full or FIFO almost full signal through NOR gate 914 will also result in deassertion of DREQ. HRWB provides bias for gates 916 and 918 and through inverter 920 to gates 922 and 924. HRWB high allows transmission of FE and FAE through gates 918 and 922 while HRWB low allows transmission of FF and FAF through gates 916 and 924. NOR gate 926 allows assertion of the DREQ through flip-flop 910 by the set DMA request signal SETDRQ synchronized with the internal clock signal CLK.

Figure 8A:
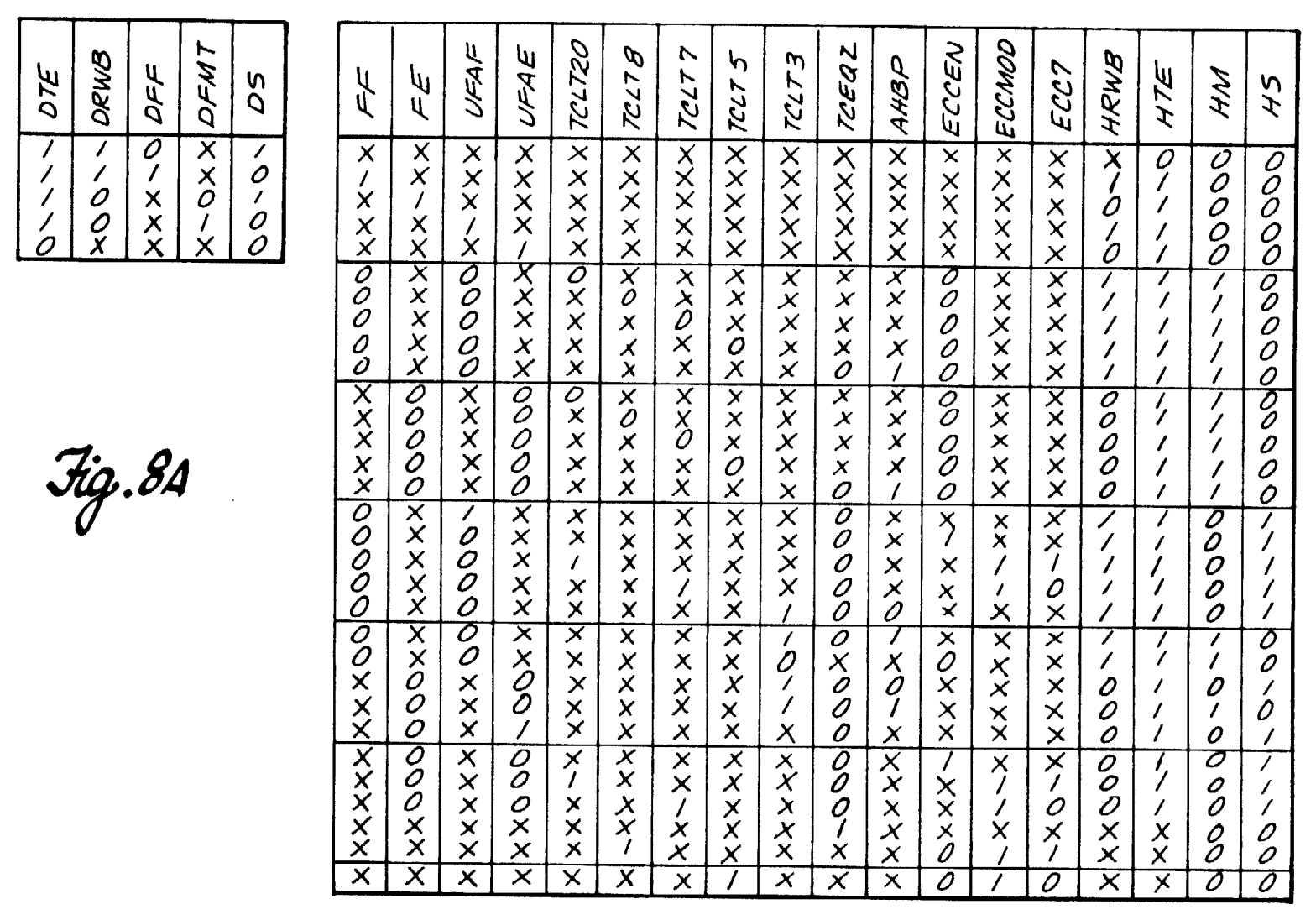

FIG. 8a provides definition of the input signals to the PLA to resolve the state transfer signals previously discussed. The disk single transfer state signal DS is resolved from the disk transfer enable signal DTE, the disk read/write bit DRWB, the disk FIFO full DFF, and the disk FIFO empty DFMT. The DS signal arises in the state machine when DTE and DRWB are asserted if DFF is not true (0). DS is also present in the state machine if DTE is asserted, DRWB is low, and DFMT is not true (0). If DTE is not asserted, DS will be zero.

The host multiple transfer signal HM and the host single transfer signal HS are resolved using a combination of signals from the second intermediate storage memory, the transfer count status signals referenced previously, and error correction code incorporation signals. The signals associated with the second intermediate storage memory include the host transfer enable signal HTE, the host read/write bit HRWB, the FIFO full signal FF, the FIFO empty signal FE, the upper FIFO almost full signal UFAF, and the upper FIFO almost empty signal UFAE. Combinations of these signals provide status of the second intermediate storage memory FIFO's as described previously.

The transfer counter status signals include transfer counter less than ten TCLT10, transfer counter less than 8 TCLT8, transfer counter less than 7 TCLT7, transfer counter less than 5 TCLT5, transfer counter less than 3 TCLT3, transfer counter equals zero TCEQZ, and the arm host buffer pointer signal AHBP. The transfer counter status signals enable the PLA to control data transfer for specialty functions such as error correction code byte transfers. Host transfer speeds provide a cycle delay of two clock periods during control execution. TCLT10 signifies that nine bytes remain to be transferred in the host transfer count. The present invention provides the capability for error correction codes of four byte or seven byte length. ECC transfer is accomplished in a host single transfer mode (HS), therefore transitioning from normal data bursting to single transfer for a seven byte ECC while accounting for the two cycle lag time must be accomplished with the transfer count at nine bytes. Similarly, TCLT7 provides capability for changing from multiple burst to single byte transfer for a four byte ECC mode. TCLT8 is provided for disabling an eight byte burst counter to be described in greater detail subsequently. TCLT3 in combination with AHBP provide for transitioning from multiple byte bursting to single transfer mode at the conclusion of a host transfer. If no subsequent host transfer has been requested, the host transfer pointer counter register will not be loaded for pipelining to the transfer counter. Consequently, the buffer pointer will not be armed and AHBP will be low. TCLT3 provides two cycle advance timing to prevent overrunning the buffer. TCEQZ prevents multiple or single host transfer when asserted.

The error correction code signals provided to the PLA include error correction control enable ECCEN. ECC mode ECCMOD indicates that error correction code verification has been selected. Error correction code seven bytes ECC7 is selected when ECCMOD is asserted and seven byte correction codes are requested. If ECCMOD is asserted and ECC7 is not asserted, a four byte error correction code is used.

The state of the PLA determined by the state transition signals DS, HS and HM are determined by the status of the first intermediate storage memory, second intermediate storage memory, transfer counter and selection of error correction. The PLA controls transfer to and from the data storage unit and the host as previously described by use of the signals as resolved in FIG. 8a.

FIG. 8b provides the state number definition based on the transfer state signals. Bits S0, S1, and S2 provide a binary code for the state counter output based on the condition of HS, HM and DS. Bits NS0, NS1 and NS2 provide a binary representation of the next state of the state counter based on the state transfer signals HS, HM and DS, and the host transfer pointer increment signal HTPI and the disk transfer pointer increment signal DTPI. HTPI is the transfer pointer increment signal TPI for the second intermediate storage memory, while DPTI is the transfer pointer increment signal for the first intermediate storage memory.

The invention further provides a means for limiting the burst length for transfer to a host computer. This feature is particularly useful for computer systems using dynamic Random Access Memory which requires refresh. Limiting of the DMA burst length by the peripheral controller precludes blocking of the host data bus during DMA transfer which could inhibit timely refresh of the DRAM. This feature is incorporated in the preferred embodiment of the invention as shown in 9A and 9B. A three-bit counter unit comprised of flip/flops 930a, 930b and 930c provides a byte transfer count. Transfer of data to the host computer is initiated with the flip/flops in a reset condition. Clocking of the flip/flops is accomplished by assertion of DACK and the buffer data enable signal BDEN through NAND gate 932 in combination with the host read enable signal HRE or the host write enable signal HWE transmitted through OR gate 934. Inverter 936 provides the proper signal polarity such that deassertion of the active signal either HRE or HWE provides a falling edge for clocking the flip/flops. Inverter 938 and NAND gate 940 interconnect the flip/flops in an incrementing counter arrangement. After six HRE or HWE pulses have been received, the counter output makes NAND gate 942 true, resulting in a low signal captured by latch 944, pulling the LBURST6-line low at OR gate 946. A low output from OR gate 946 forces NAND gate 548 false, in turn, forcing NAND gate 950 true with the next HRE or HWE pulse, thereby forcing a reset of flip/flop 910 through NAND gate 908.

The byte/burst counter may be overridden by assertion of the burst continuous signal BCONT through OR gate 946. In addition, deassertion of the burst data enable signal BDEN transmitted through inverter 952 forces NAND gate 954 true, thereby if the transfer count for transfer of data to the host is less than 8, indicating fewer than 8 bytes remaining in the transfer, the transfer count less than 8 signal TCLT8 will be asserted. If in addition no subsequent host data transfer is waiting, indicated by the arm host buffer pointer signal not being asserted, AHBP-low, then NAND gate 956 will become true, forcing a reset of the DMA request to institute single stepping for data transfer from the second intermediate storage memory.

The invention, as implemented in the preferred embodiment and described above, provides a peripheral controller with exceptional data transfer efficiency. The flexibility for interfacing with various host computer types permits implementation of the invention in a broad spectrum of applications.

Having now described the invention in detail in accordance with the requirements of the Patent Statutes, those skilled in this art will have no difficulty in making changes and modifications in the individual circuits or their relative connection in order to meet specific requirements or conditions. Such changes and modifications may be made without departing from the scope and spirit of the invention as set forth in the following claims.

We claim:

1. A circuit for managing access to a buffer memory having a multiplicity of addressable locations, to provide for parallel and asynchronous data transfer operations in which data are transferred between the buffer memory and a data storage unit controller, and data are transferred between the buffer memory and a host computer, the circuit comprising:
   a pair of multi-location, first-in, first-out memory means, a first one of the pair being connected to provide intermediate storage of data transferred in first-in, first-out order between the data storage unit controller and the buffer memory and in first-in, first-out order between the buffer memory and the data storage unit controller, a second one of the pair being connected to provide intermediate storage of data transferred in first-in, first-out order between the host computer and the buffer memory and in first-in, first-out order between the buffer memory and the host computer;
   addressing means for the buffer memory, the addressing means including a first selectable counter means and a second selectable counter means;
   address selecting means including means for selecting the first selectable counter means to provide addresses to the buffer memory during operations in which data are transferred between the buffer memory and the first of the first-in, first-out memory means, and including means for selecting the second counter means to provide addresses to the buffer memory during operations in which data are transferred between the buffer memory and the second of the first-in, first-out memory means; and
   a management means for coordinating read and write enablement of the pair of first-in, first-out memory means and the buffer memory.

2. A circuit as defined in claim 1, wherein the address selecting means comprises a multiplexer responsive to the management means.

3. A circuit as defined in claim 1, wherein the addressing means includes a first and a second buffer pointer register, wherein the first counter means is connected between the first buffer pointer register and the buffer memory, and wherein the second counter means is connected between the second buffer pointer register and the buffer memory; and wherein the management means includes means for providing a first load command to cause a buffer address stored in the first buffer pointer register to be transferred to the first counter means, and includes means for providing a second load command to cause a buffer address stored in the second buffer pointer register to be transferred to the second counter means.

4. A circuit as defined in claim 1, further comprising: a counter means for counting data bytes transferred between the second of the first-in, first-out memory means and the host computer, the counter means providing a control input to the management means.

5. A circuit as defined in claim 1, wherein each of the first and second first-in, first-out memory means includes separately incrementable circular read and write pointers, and separate read and write enable ports responsive to the management means.

6. A circuit as defined in claim 5, wherein the management means includes means for issuing read unable and write enable commands to the pair of first-in, first-out memory means, and wherein each of the pair includes a differential counter means responsive to the read enable and write enable commands issued by the management means, each of the differential counter means further providing a plurality of status signals to the management means representative of the read pointer and write pointer difference.

7. A circuit as defined in claim 1, wherein the second of the first-in, first-out memory means further comprises a lower first-in, first-out memory for a plurality of first bytes of a two-byte word string and an upper first-in, first-out memory for a plurality of second bytes of the two-byte word string, the upper and lower memory commonly selectable by the host computer and alternatingly selectable by the management means for data transfer between the buffer memory and host computer whereby a host computer having a two-byte wide data bus may read and write directly to the second of the first-in, first-out memory means.

8. A circuit as defined in claim 1, wherein the management means comprises a programmable logic array.

9. A circuit as defined in claim 1, and further comprising:
a host bus for connecting the circuit to the host computer; a microprocessor bus for connecting the circuit to an external microprocessor;
a means for generating a first mode signal, a second mode signal, and a third mode signal, the generating means responsive to a configuration of the host computer interfaced;
a first plurality of registers responsive to the first mode signal communicating with the microprocessor through the microprocessor bus for communication with a first plurality of host computer registers through the host bus;
a second plurality of registers responsive to the second mode signal communicating with the microprocessor through the microprocessor bus for communication with a second plurality of host computer registers through the host bus;
a third plurality of registers responsive to the third mode signal communicating with the microprocessor through the microprocessor bus and connected to the host bus for communication with a third plurality of host computer registers, whereby combined selection of the mode signals enables a combination of the first, second, and third plurality of registers for interface between the microprocessor and a variety of host computer registers supporting differing configurations of host computers.

10. A circuit as defined in claim 1, and further comprising a host bus for connecting the circuit to the host computer; a microprocessor bus for connecting the circuit to an external microprocessor; a buffer bus for connecting the circuit to the buffer memory; and a data storage unit bus for connecting the circuit to the data storage unit controller.

11. A circuit as defined in claim 10, further comprising a bi-directional tristate driver means coupling the microprocessor bus and the data storage unit bus.

12. In combination, a data storage unit controller, a multiple-interface circuit, and a data storage unit bus interconnecting the controller and the circuit, the controller for communicating with an external data storage unit at a first, relatively-low data transfer rate, and the circuit for communicating at a second, relatively-high data transfer rate with both an external buffer memory having a multiplicity of addressable locations, and an external host computer, the circuit comprising:
a buffer bus for connecting the circuit to the buffer memory;
a host bus for connecting the circuit to the host computer;
a pair of multi-locations, first-in, first-out memory means, a first one of the pair being connected between the data storage unit bus and the buffer bus, the first one of the memory means bidirectionally transferring data to and from said data storage unit controller in first-in, first-out order at a first relatively-low data transfer rate, and bidirectionally transferring data to and from the buffer memory in first-in, first-out order at the second relatively-high data transfer rate a second one of the pair being connected between the host bus and the buffer bus, the second one of said memory means bidirectionally transferring data to and from said host computer in first-in, first-out order and to and from said buffer memory in first-in, first-out order at the second relatively-high data transfer rate;
addressing means for the buffer memory, the addressing means including a first selectable counter means and a second selectable counter means;
address selecting means including means for selecting the first selectable counter means to provide addresses to the buffer memory via the buffer bus during operations in which data are transferred between the buffer memory and the first of the first-in, first-out memory means, and including means for selecting the second counter means to provide addresses to the buffer memory via the buffer bus during operations in which data are transferred between the buffer memory and the second of the first-in, first-out memory means; and
a management means for coordinating read and write enablement of the pair of first-in, first-out memory means and the buffer memory to provide for parallel and asynchronous operations in which data are transferred between the buffer memory and the data storage unit controller, and data are transferred between the buffer memory and the host computer.

13. A circuit as defined in claim 12, wherein the address selecting means comprises a multiplexer responsive to the management means.

14. A circuit as defined in claim 12, wherein the addressing means includes a first and as second buffer pointer register, wherein the first counter means is connected between the first buffer pointer register and the buffer memory, and wherein the second counter means is connected between the second buffer pointer register and the buffer memory; and wherein the management means includes means for providing a first load command to cause a buffer address stored in the first buffer pointer register to be transferred to the firs counter means, and includes means for providing a second load command to cause a buffer address stored in the second buffer pointer register to be transferred to the second counter means.

15. A circuit as defined in claim 12, further comprising:
 a counter means for counting data bytes transferred between the second of the first-in, first-out memory means and the host computer, the counter means providing a control input to the management means.

16. A circuit as defined in claim 12, wherein each of the first and second first-in, first-out memory means includes separately incrementable circular read and write pointers, and separate read and write enable ports responsive to the management means.

17. A circuit as defined in claim 16, wherein the management means includes means for issuing read enable and write enable commands to the pair of first-in, first-out memory means, and wherein each of the pair includes a differential counter means responsive to the read enable and write enable commands issued by the management means, each of the differential counter means further providing a plurality of status signals to the management means representative of the read pointer and write pointer difference.

18. A circuit as defined in claim 12, wherein the second of the first-in, first-out memory means further comprises a lower first-in, first-out memory means further comprises a lower first-in, first out memory for a plurality of first bytes of a two-byte word string and an upper first-in, first-out memory for a plurality of second bytes of the two-byte word string, the upper and lower memory commonly selectable by the host computer an alternatingly selectable by the management means for data transfer between the buffer memory and host computer whereby a host computer having a two-byte wide data bus may read and write directly to the second first-in, first-out memory means.

19. A circuit as defined in claim 12, wherein the management means comprises a programmable logic array.

20. A system for controlling data transfer operations between a data recording unit and a host computer, the system comprising:
 a multi-interface circuit including a plurality of busses including an address and data bus, a data storage unit bus, a buffer bus, and a host bus;
 a microprocessor connected to the circuit by the address and data bus for master timing and control of data transfer responsive to host computer requests;
 a buffer memory having a multiplicity of addressable locations, the buffer memory being connected to the circuit by the buffer bus;
 a data storage unit controller for communicating with the data storage unit at a first, relatively-low data transfer rate, the data storage unit controller being connected to the circuit by the data storage unit bus;
 the circuit further including:
 a first multi-location, first-in, first-out memory means connected between the data storage unit bus and the buffer bus to provide intermediate storage of data transferred in first-in, first-out order between the data storage unit controller and the buffer memory and in first-in, first-out order between the buffer memory and the data storage unit controller, with the data transfer between the first memory means and the data storage unit controller at a relatively-low data transfer rate via the data storage unit bus and with data transfer between the first memory means and buffer memory at a relatively-high data transfer rate via the buffer bus;
 a second multi-location, first-in, first-out memory means connected between the host bus and the buffer bus to provide intermediate storage of data transferred in first-in, first-out order between the host computer and the buffer memory and in first-in, first-out order between the buffer memory and host computer, with data transfer between the second memory means and the host computer and buffer memory at a relatively high data transfer rate via the host bus and via the buffer bus respectively;
 addressing means for the buffer memory, the addressing means including a first selectable counter means and a second selectable counter means;
 address selection means including means connected between the addressing means and the buffer bus for selecting the first selectable counter means to provide addresses to the buffer memory during operations in which data are transferred between the buffer memory and the first multi-location, first-in, first-out memory means, and including means for selecting the second counter means to provide addresses to the buffer memory during operations in which data are transferred between the buffer memory and the second multi-location, first-in, first-out memory means; and
 a management means responsive to the microprocessor for coordinating read and write enablement of each of the multi-location, first-in, first-out memory means and the buffer memory to provide for parallel and asynchronous operations in which data are transferred between the buffer memory and the data storage unit controller, and data are transferred between the buffer memory and the host computer.

21. A system as defined in claim 20, wherein the address selecting means comprises a multiplexer responsive to the management means.

22. A system as defined in claim 20, wherein the addressing means includes a first and second buffer pointer register, wherein the first counter means is connected between the first buffer pointer register and the buffer memory, and wherein the second counter means is connected between the second buffer pointer register and the buffer memory; and wherein the management means includes means for providing a first load command to cause a buffer address stored in the first buffer pointer register to be transferred to the first counter means, and includes means for providing a second load command to cause a buffer address stored in the second buffer pointer register to be transferred to the second counter means.

23. A system as defined in claim 20, further comprising:
   a counter means for counting data bytes transferred between the second multi-location, first-in, first-out memory means and the host computer, the counter means providing a control input to the management means.

24. A system as defined in claim 20, wherein each of the first and second multi-location, first-in, first-out memory means includes separately incrementable circular read and write pointers, and separate read and write enable ports responsive to the management means.

25. A system as defined in claim 24, wherein the management means includes means for issuing read enable and write enable commands, wherein each of the first and second multi-location, first-in, first-out memory means includes a differential counter means responsive to the read enable and write enable commands issued by the management means, each of the differential counter means further providing a plurality of status signals to the management means representative of the read pointer and write pointer difference.

26. A system as defined in claim 20, wherein the second multi-location first-in, first-out memory means further comprises a lower first-in, first-out memory for a plurality of first bytes of a two-byte word string and an upper first-in, first-out memory for a plurality of second bytes of the two-byte word string, the upper and lower memory commonly selectable by the host computer and alternatively selectable by the management means for data transfer between the buffer memory and host computer whereby a host computer having a two-byte wide data bus may read and write directly to the second first-in, first-out memory means.

27. A system as defined in claim 20, wherein the management means comprises a programmable logic array.

* * * * *

UNITED STATES PATENT AND TRADEMARK OFFICE
CERTIFICATE OF CORRECTION

PATENT NO. : 5,121,480
DATED : June 9, 1992
INVENTOR(S) : Carl Bonke; Han Jen; Marc Acosta It is certified that error appears in the above-identified patent and that said Letters Patent is hereby corrected as shown below:

On the title page:

[75] Inventors, change "Marc Acost" to -- Marc Acosta --.

Column 7, line 47, after "OR" insert -- gate --.
Column 7, line 68, change "date" to -- gate --.

Column 8, line 44, change "transfer" to -- transfers --.

Column 19, line 5, before "second" change "as" to -- a --.
Column 19, line 8, before "counter" change "firs" to -- first --.
Column 19, line 43, after "memory" delete "means".
Column 19, line 48, after "computer" change "an" to -- and --.
Column 19, line 43, delete "further".

UNITED STATES PATENT AND TRADEMARK OFFICE
CERTIFICATE OF CORRECTION

PATENT NO. : 5,121,480

DATED : June 9, 1992

INVENTOR(S) : Carl Bonke, et al.

It is certified that error appears in the above-identified patent and that said Letters Patent is hereby corrected as shown below:

Column 19, line 44, delete "comprises a lower first-in, first out memory".

Signed and Sealed this

Thirtieth Day of November, 1993

Attest:

BRUCE LEHMAN

Attesting Officer

Commissioner of Patents and Trademarks